United States Patent [19]

Kauderer

[11] 4,162,237

[45] Jul. 24, 1979

[54] CEMENT FOR WALL AND FLOOR COVERINGS AND THE LIKE

[76] Inventor: Albert Kauderer, Tobelwasenweg 23, 7315 Wilhelm, Fed. Rep. of Germany

[21] Appl. No.: 786,304

[22] Filed: Apr. 11, 1977

[30] Foreign Application Priority Data

| Apr. 10, 1976 [DE] | Fed. Rep. of Germany | 2615725 |
| Feb. 22, 1977 [DE] | Fed. Rep. of Germany | 2707571 |
| Feb. 22, 1977 [DE] | Fed. Rep. of Germany | 2707570 |

[51] Int. Cl.² ............................................. C08L 1/28
[52] U.S. Cl. .............................. 260/17 R; 260/42.18; 428/325; 428/355
[58] Field of Search ........................ 260/17 R, 42.18; 428/325, 355

[56] References Cited

U.S. PATENT DOCUMENTS

| 3,498,827 | 3/1970 | Vanderbilt | 428/339 |
| 3,535,275 | 10/1970 | Gilbert | 260/6 |
| 3,801,347 | 4/1974 | Keller | 427/25 |
| 3,926,894 | 12/1975 | Clark | 260/42.55 |

OTHER PUBLICATIONS

Chem. Absts., vol. 70:12276c, Adhesives for Insulation Materials, Tetzke et al.
Chem. Absts., vol. 70:29788u, PVac . . . Glue . . . Patterns, Voitovich.
Chem. Absts., vol. 72:56810t, Elastic Material for Joint Sealing, Mottier.
Chem. Absts., vol. 81:154,801w, Decorative Flooring Surfaces, Fuller et al.
Chem. Absts., vol. 84:126056a, Compositions . . . Densities, Viazzi.
Chem. Absts., vol. 85:162032u, Coating Compositions . . . Rugged Surface Films, Takei.

*Primary Examiner*—Edward M. Woodberry
*Attorney, Agent, or Firm*—Edwin E. Greigg

[57] ABSTRACT

A cement for attaching covering to walls, floors and similar bases includes an adhesive substance which may be glue or a synthetic adhesive and a filler material which may be powdered glass or quartz and which has the property of not interacting with the adhesive nor to be dissolved therein and to adhere to the adhesive substance only slightly or not at all. When the layer of cement dries after attachment, e.g., of the wall covering to the wall, the covering may subsequently be removed therefrom by simply pulling and without damage to either the base or the covering, because the cement splits into two separate layers, one of which remains on the base and the other of which remains on the covering being removed. In another embodiment, a layer of cement is applied to the covering and then dried. For attachment of the covering to the base, another layer of either splittable or non-splittable cement is applied to the layer of dried cement already present. Upon removal of the covering, the first cement layer splits into two layers.

32 Claims, 3 Drawing Figures

CEMENT FOR WALL AND FLOOR COVERINGS AND THE LIKE

BACKGROUND OF THE INVENTION

The invention relates to a cement or paste for attaching coverings to the walls or floors of buildings or the like. More particularly, the invention relates to a cement or paste for attaching especially waterproof or water-resistant wallpaper and for attaching coverings for ceilings, walls and floors such as carpets, plastic floor coverings and the like. These coverings may be particularly pads for carpets, plastic coverings, wall hangings, plastic covered cardboard, textiles covered in front or back with plastic foils, rearwardly paper covered textiles, coverings made from foam, etc. and the like.

Wall coverings and other covers of this type which generally have a substantial value require the use of well adhering cements which however generally make it difficult to remove these wallpapers and covers from the base to which they have been applied which may be concrete, plaster, brick, wood, plaster wall, styrofoam, covered or uncovered constructions plates, and the like.

Commercially available wallpaper remover is available as a chemical fluid for the purpose of removing non-waterproof wallpaper. This material penetrates the wallpaper and dissolves the cement. While these paper-removing chemicals are very effective, they cannot be used in waterproof wallpaper unless the wallpaper is previously perforated which would require additional work. In general, the heretofore known methods for removing wallpaper require substantial expenditures of time and effort and therefore of cost, in addition to resulting in substantial amounts of soiling of the room in which the removal takes place.

OBJECT AND SUMMARY OF THE INVENTION

It is a principal object of the invention to provide a cement or adhesive paste for wallpaper coverings and the like which provides excellent adhesive power but permits at the same time a rapid and simple subsequent release of the wallpaper or the covering from the base on which they have been attached.

This object is attained according to the invention by providing a cement which includes a mixture of an adhesive substance and a powder-like inert material, wherein the adhesive substance remains flexible after drying and wherein the powder-like material consists of particles of very small grain size which do not adhere substantially to the adhesive material and which do not react chemically with the adhesive material and are not soluble therein.

The presence of the mixed-in powder permits the removal of the wallpaper or covering by splitting the dried cement layer.

For the purpose of describing the present invention, the words "cement" or "paste" will be used to describe the finished product within which are contained adhesive substances, subsequently referred to as adhesives. The adhesive substances are the materials which provide the adhesive property to the cement.

The cement may consist only of the adhesive substance and the powder mixed therewith but may also contain other constituents although preferably only in small quantities. These constituents may be those which aid storage and conservation and their grain size would be approximately 2 orders of magnitude smaller than that of the powder.

A surprising advantage of the cement according to the present invention over any cement previously used for these purposes is that it provides reliable and long term adhesion of the wall covering to the base while at the same time permitting the rapid and dry and very simple release of the wall covering by simple manual removal. In general, the web to be removed can be released, without any tendency to tear, in one piece. Thus the cement according to the present invention permits a simple, rapid and clean removal of well-adhering wallpapers and coverings with very little expenditure of force. The cement may be so constituted that a wallpaper web of normal width can be pulled off by using a force of a few kilograms, for example, depending on the particular type of cement, a force from 1 to 6 kilograms. The adhesive substance within the cement according to the present invention may be one of several such substances. An important condition is however that it be flexible when dry, i.e., it should not be a hard, brittle glue or adhesive substance. It must adhere well to the covering as well as to the base. It is advantageous if the filler powder has grains of substantially uniform size, i.e., that the spread of grain sizes is small and that the grain size is also small. It is also advantageous if the surfaces of the grains, i.e., of the particles, are smooth and if the grains themselves are quasi-spherical and preferably spherical. All the aforementioned characteristics are particularly advantageous but the invention is not limited thereto provided that the cement is such that when the wallpaper or covering is removed, the tear plane lies within the layer of cement, in particular that it pass between layers of grains present within the layer of cement, so that the two layers which are produced by splitting when the covering is removed each contain powder grains in large quantities and thus acquire relatively rough surfaces. If the wall covering or the base has spots on which the cement does not adhere properly for some reason, for example because the base was not properly prepared or because it still has on it old pieces of wallpaper paste, it may happen that in that area the layer of cement is completely released from the covering or from the base but this should be prevented if possible so that the adhesive effect is distributed over the entire surface and this may always be achieved with sufficient care. It may be necessary however to treat the wall or floor or ceiling in the proper manner prior to the attachment of the wallpaper or covering and preferably to provide it with a water repellent or water resistant base. In many cases, the cement itself may be used as such a base material, i.e., the base may be covered with a layer of the cement according to the invention. Thereafter, this cover would be left to dry and then the layer of cement for attaching the wallpaper or covering would be applied to the previously prepared base or to the wall covering or both.

General limits with respect to the weight or volume percent ratios of the filler powder to the dry quantity of adhesive substance should be maintained in order to obtain the described splitting of the layer of cement. In general, it will be suitable to provide that the dried cement (i.e., that obtained after evaporation of the solvent or dispersent, such as water or other solvent) consist of 5 to 20 volume percent of dry adhesive substance and 80 to 95 percent of filler powder.

In many cases, it may be suitable to manufacture only the dry constituents of the cement either separately or premixed and to add the solvent or thinner or dispersent at a later time, for example at the point of use. In this manner, the viscosity of the cement may be altered depending on the utilization.

The filler material which is present in powdered form, which neither dissolves in nor reacts with the adhesive substance, has been proven to be particularly advantageously such that the maximum of the nomogram describing the grain size is in the region from 0.005 to 0.035 mm. If the cement is used for the attachment of floor coverings or of wall coverings made from textiles, it may suitable to choose a mean grain size of the filler powder larger than that which would be used for cements intended for attaching wallpaper, i.e., preferably between 0.020 and 0.035 mm. For cements used for wall covers, the maximum of the nomogram of grain size may preferably general between 0.005 and 0.025 mm, and suitably between 0.010 to 0.020 mm and very often advantageously between 0.015 to 0.020 mm. It is also advantageous in general if all the grains of the powder exhibit substantially the same size but powders with a variation in grain size can also be advantageously provided. Such powders are generally cheaper but the variation of the grain size must not be too great. Preferably it should be provided that the grain size of at least 95 percent by weight of the powder does not depart from the maximum of the nomogram by more than ±0.018 mm and preferably by less than ±0.014 mm. Preferably, at least 90 weight percent of the powder should have a grain size within ±0.008 mm of the maximum of the nomogram which indicates the distribution of grain sizes. Furthermore, it is an advantage if the grain size of at least 50 percent by weight of the powder lies within ±0.006 mm of the maximum of the distribution curve and preferably within ±0.005 mm. When the grain size of the filler material is not uniform, i.e., when there is dispersion of the grain size, it is especially suitable if the maximum of the distribution curve is at or near the average grain size and that the distribution curve preferably is parabolic or bell-shaped.

Different powders and in many cases powder mixtures can also be provided. It has been found to be particularly favorable if the powder is fine grain quartz powder which is relatively inexpensive and has relatively little tendency to adhere to the adhesive substances used in the cement according to the present invention.

In many cases, the filler powder can advantageously be made from thermoplastic material and in particular be polyethylene powder. In a favorable further development it is provided that the powder consists of softened plastic particles, preferably softened PVC. Glass powder is superbly suited for use as the filler powder. In many cases it may be suitably provided that the powder is made from elastomeric particles, preferably of rubber or rubber substitutes. Other powders and mixtures are also possible.

When the wallpaper or covering is attached to its base it is important to apply the cement in layers of sufficient thickness that when the cement has dried a removal of the wall covering is possible by splitting the layer of cement. The layer of the dried cement should have a thickness in general at least twice as large as the average grain size of the filler powder, preferably at least be 2.5 times as thick as the average grain size. The cement layer may also be made thicker but will then be less economical. It has been found to be very favorable if the cement layers have thicknesses of from 2.5 to 4 times the size of the average grain of filler material. Any desired thickness can be obtained by suitable adjustment of the viscosity of the cement. The advantageous viscosities for cement of this type are those which lend to it a pasty or plaster-like consistency. When the layer of cement between the wallpaper or covering and its base has dried, the layer then consists primarily of the powder because the powder grains are packed relatively tightly and the distance between them is relatively small. It has been demonstrated that in many cases voids are formed within the cement during drying. The dried adhesive within the cement in which the powder particles are imbedded has been stated to be flexible, i.e., it is both compressible and extensible. This flexibility can be so high as to result in an elastic or pseudo-elastic behavior.

Any suitable adhesive substances can be used within the cement according to the invention provided that they adhere well to the base and to the wallpaper or covering, at least on the side adjacent to the base. The invention permits the use of adhesive substances which adhere more rigidly to the wall covering and to the base than any cement previously used reasonably for attaching wallpaper or other coverings to their base. For until now it had been necessary to use cements which attached the covering to its base with sufficient strength so as to prevent any unwanted release but one had to avoid the use of cements which made any release impossible or possible only with damage to the base, i.e., a compromise had to be made between adhesion and the release in principle, for example by scraping. In many cases, especially when heavy wall coverings were involved, such a compromise was not possible so that, in the past, very strongly adhesive substances were used which permitted a release only with substantial damage to the base on which the covering had been placed. These difficulties are removed by the present invention.

The adhesive substances which can be used in the cement of the present invention comprise very different and numerous substances. They are preferably adhesive dispersions, adhesive substances of synthetic resins or elastomers contained in solvents, natural or artificial and possibly softened glue in aqueous solution and other adhesive substances which are flexible when dried and which adhere to the filler powder only little or not at all but which adhere well to the base and to the covering. Preferably, the adhesive substance can be a single substance but it is also possible to consider a mixture of several different substances.

A softened adhesive is advantageously one which consists of an aqueous solution of methylcellulose softened by the addition of a softening substance, preferably of polyalkyleneglycol ether or polyethyeleneglycol. These preferred softeners do not migrate out of the adhesive (as had been the case with previously used additional softeners which could be added only in small quantities) and may be added in any practically desired magnitude so that the resultant adhesive substance can have any desired consistency.

The molar weight of the polyethyleneglycol is preferably 300 but other molar weights are possible. One particular type of polyethyleneglycol used in experiments was that supplied by the firm Tensid-Chemie of Germany commercialized under the tradename Plureol E 300 having a molar weight of 300. This adhesive which is made from methylcellulose softened with polyethyleneglycol or polyalkyleneglycol ether can also be used in other fields of application, even without the addition of filler powder, because it can be softened as much as desired, thereby permitting its use where adhesives based on methylcellulose were not useable. For example it may be used as a wallpaper paste for any type of wallpaper, as a book binding glue, cardboard glue, etc. It is also particularly inexpensive and has improved adhesion because of the increased softness.

In order to control the adhesive strength and the water resistance of the resulting cements, especially if the adhesive substance within them is a dispersion adhesive, the cement of the present invention may be complemented with aqueous wax dispersions, preferably macroparaffinic wax dispersions, silicones or hydrophobic metal soaps, for example zinc or aluminum stearate in suitable quantities. For the former it is suitable to reduce the proportion of water.

When dispersion adhesives are used, there may be added materials which aid in forming films, for example higher alcohols, acetate, aromate, aliphate, glycol, etc. Such film-forming substances also increase the effect of the previously mentioned wax dispersions, metal soaps and silicones if present.

The invention will be better understood as well as further objects and advantages become more apparent from the ensuing detailed description of a number of recipes for the cement according to the present invention taken in conjunction with the drawing.

DETAILED DESCRIPTION OF PREFERRED EMBODIMENTS

Recipe 1

Figure 3:
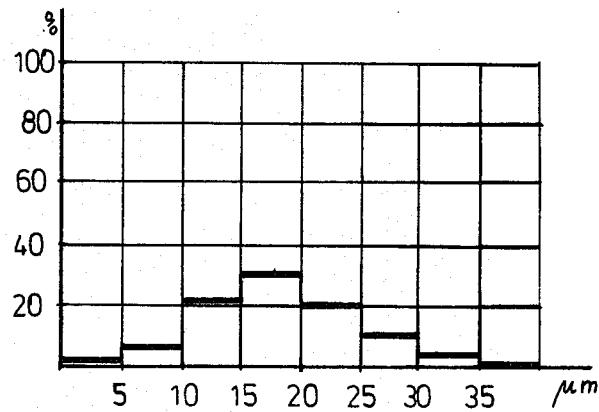

60 grams of powdered methylcellulose (viscosity 30,000 cP in 2% solution) is mixed with 910 milliliters of very fine quartz powder. During the mixing 30 grams of liquid polyalkyleneglycol ether is sprayed in as a softener. This mixture is then added while stirring into 3.5 liters of water, preferably only just prior to use, so that the methylcellulose and the softener are dissolved. The resultant cement may be used cold. It is especially useful for the attachment of heavy wall coverings of all kinds. The very fine quartz powder used with most efficient results had a distribution of grain sizes as illustrated in FIG. 3. Its pouring weight was 1 g/cm$^3$ and its specific surface was 0.5 m$^2$/g.

Recipe 2

Identical to recipe 1 except for the following differences:

Use 90 grams of methylcellulose (viscosity 2,000 cP in 2% solution), 45 grams of polyalkyleneglycol ether and 1.365 liters of quartz powder according to FIG. 3 in 3.5 liters of water.

This cement is especially suitable for very heaviest wall coverings of all kinds.

Recipe 3

20 to 25 grams of methylcellulose (20,000 cP in 2% solution) is added as stabilizer and thickener to 900 milliliters of water. This liquid is mixed with 0.9 liters of quartz powder as in recipe 1 or quartz powder having a somewhat coarser mean grain size, for example an average grain size of 0.025 millimeters to which are then added 200 milliliters of a 50% dispersion of acrylic acid-butyl ester as a binding material while stirring.

The resultant cement has a paste-like consistency and is used especially for the attachment of textiles as floor coverings or for wall coverings which are otherwise difficult to attach.

Recipe 4

Same as recipe 3 except the binding material is a mixture of a 50% dispersion of acrylic acid-butyl ester and a 50% latex consisting of styrol butadiene. By changing the weights and volumes of the individual components, the elasticity and adhesive power can be adjusted.

Recipe 5

Same as recipe 1 except for the use of 4 liters of water. This cement is used especially for the attachment of medium heavy wall coverings of all kinds.

Recipe 6

Same as recipe 1 except for the use of 3 liters of water. This cement is used for heavy wall coverings of all kinds.

Recipe 7

100 grams of of an elastomer consisting of styrol butadiene rubber is mixed in 0.9 liters of an organic solvent to which are added 0.9 liters of quartz powder (the same as in recipe 1) and the desired viscosity of the paste is obtained by the addition of suitable quantities of the material Bentone (manufacturer Titan Co., Leverkusen, Germany), an earth mineral, namely earths which contain a mineral of the montmorillonite type or Aerosil (manufacturer Degussa Co., Germany), a pure coagulated silicon dioxide aerosol. This cement is especially suitable for textile floor coverings and heavy wall coverings with poor diffusion properties.

Recipe 8

The same as any one of the recipes 1-5 but instead of quartz powder, there is used at least partially corresponding volumes of polyethylene powder or a rubber substitute powder or a powder made from softened PVC or rubber powder of suitable grain size.

Recipe 9

Same as any of the recipes 1-8 but where the distribution of grain sizes of the mixed-in powder is narrower than the previous ones.

Recipes 10 and 11

Same as recipes 1 and 2 respectively but instead of using polyalkyleneglycol ether as a softener there is used in the same weight proportions polyethyleneglycol. This results in a long shelf life of the cement. Furthermore, the quartz powder of FIG. 2 may be used instead of that according to FIG. 3.

Recipe 12

Figure 1:
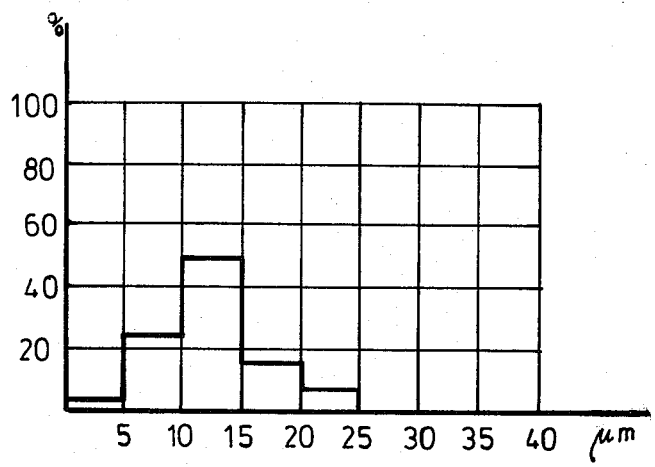
FIGS. 1-3 are nomograms showing the distribution of grain sizes in the filler material used in the cement and illustrating the percentage of grains lying within a given grain size range.

38.0 grams of methylcellulose (viscosity 30,000 cP in 2% solution) in powder form are mixed with 693.0 grams of very fine quartz powder having a grain size probability curve according to FIG. 1. Under further mixing there is added 19 grams of polyethyleneglycol (for example the previously mentioned type available under the commercial name Plureol E 300) to act as a softener. The resulting mixture is a powder in which the ratio of the weight of adhesive (methylcellulose and polyethyleneglycol) to that of the quartz powder is 0.082 and which is mixed under stirring with 3 to 4 liters of water to produce a viscous cement while the methylcellulose and the softener are dissolved. The resultant cement has a paste-like consistency and can be used cold. It is very useful as a wallpaper paste but can also be used for other coverings.

Recipe 13-16

Same as recipe 12 but with the weights of methylcellulose, polyethyleneglycol and fine quartz powder as stated in the following table:

| Recipe | 6 | 7 | 8 | 9 |
|---|---|---|---|---|
| methylcellulose (grams) 30,000 cP in 2% solution | 45.0 | 53.6 | 60.0 | 68.0 |
| fine quartz powder (grams) grain size curve according to Fig. 1 | 682.5 | 669.6 | 666.0 | 648.0 |
| polyethyleneglycol (grams) molar weight 300 | 22.5 | 26.8 | 30.0 | 34.0 |
| total weight (grams) | 750.0 | 750.0 | 750.0 | 750.0 |
| weight ratio of adhesive to quartz powder | 0.099 | 0.120 | 0.136 | 0.157 |

To these powders are added in each case 3 to 4 liters of water to produce the cement. These cements are also used for example as wallpaper pastes. However, they are also useful for the installation of coverings other than wallpapers and may have a paste-like consistency. The fine quartz powder having grain sizes distributed according to FIG. 1 lends to the dried cement a particularly favorable splitting property and the weight ratio (or the volume ratio) of adhesive substance to quartz powder is not critical over a wide domain as indicated for example in recipes 12-16 so that a cement made with quartz powder according to the probability curve of FIG. 1 or a similar curve is distinguished in that the amount of adhesive substance is not critical within wide limits. For this reason, the amount of adhesive within the cement can be made so high that if the cement is used for the attachment of absorbent wallpapers or coverings and/or if this material is attached to a base which is also absorbent, these absorbent properties of the covering or base permit removal of the adhesive material from the cement but do not substantially alter the adhesive strength of the cement.

Recipes 17-21

Figure 2:
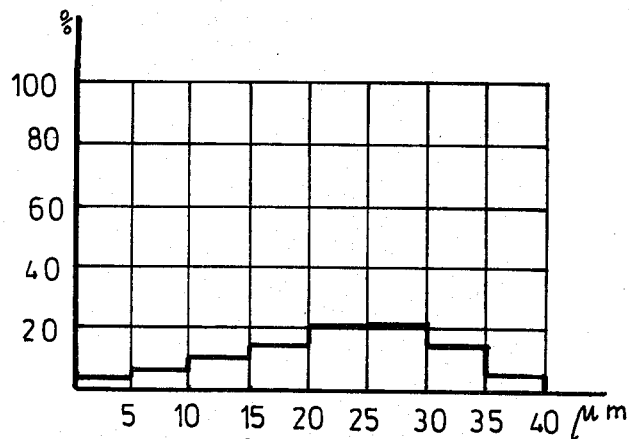

Same as recipes 12-16, but distinguished by the use of quartz powder of a grain size according to the probability curve of FIG. 2 and in such quantities that for the same weight proportion of adhesive the total weight of the powder is increased from 750 grams to 1,000 grams. These cements are also used for example as wallpapers pastes. The quartz powder according to FIG. 1 as used in the recipes 12-16 is different from that of the probability curve of FIG. 2 in that it permits to apply the cement in thinner and therefore more economical layers without endangering its capability for subsequent splitting. Experiments made with cements made according to the recipes 12-16 compared with those of cements made according to recipes 17-21 show that the minimum thickness of the required cement layer made according to the recipes 12-16 can be 30 to 50 percent less than in cements made according to recipes 17-21.

The quartz powder according to FIG. 2 is especially useful for paste-like cements which may be applied with a spatula to attach very heavy wall or floor coverings, for example carpet under-pads, linoleum, or the like.

It will be appreciated that the quartz powder, the grain sizes of which obey the distribution curves of FIGS. 1 to 3, can be used quite generally for cements which permit the removal of the coverings attached thereby by virtue of the splitting of the dried cement layer so that the adhesive substance within the cement can have any desired suitable composition.

For example, in the recipes 1-9 it is possible to use the quartz powder of FIGS. 1 and 2 instead of the quartz powder according to FIG. 3, as previously described, if necessary with a changed volumetric or weight proportion. It will also be appreciated that quartz powder of similar or different grain size distribution could be used if the splittability of the dried cement layer is still maintained and also provided that the adhesion of the wallpaper or the floor covering on the base is still maintained. The suitable proportion in weight or volume of the quartz powder in any cement should be determined by experiments by trying quartz powders of different distribution curves of the grain size and also be changing the proportion thereof.

The abscissa of the distribution curves in FIGS. 1 and 3 indicates the grain size in microns ($10^{-6}$m) while the ordinate gives the weight of these grains as a percentage of the total.

It is often desirable if the cement dries quickly especially when attaching wallpaper or coverings having very small ability for the diffusion of water on bases (walls, floors, ceilings) which also have a low capability of diffusing water, for example styropor, plastic plates or the like. For this purpose it may be provided that the adhesive substance within the cement is a plastic dispersion and that the water content of the cement containing the quartz or glass powder is less than 30 weight percent. It is especially advantageous if the water content of the finished cement is 20 to 25 percent by weight. Preferably the plastic dispersion serving as adhesive substance is a softened and preferably internally softened dispersion which has a high capability of accepting glass or quartz powder and a high extensibility without tearing. The capacity to accept filling material is intended to mean that the adhesive substance can accept a large amount of glass or quartz powder without coagulating. It is thus the danger of coagulation which limits the capability to accept filler material. Particularly suitable dispersions have been found to be those in which the adhesive substance is an acrylic ester copolymer dispersion or a terpolymer dispersion on the basis of vinyl acetate, vinyl versatate and acrylate.

There now follow preferred recipes for cements in which the water content is less than 30% by weight.

Recipe 22

0.5 parts by weight of methylcellulose in powder form (viscosity 6,000 cP in a 2% solution) are added under stirring to 16 parts by weight of water to act as stabilizer. After dissolution of the methylcellulose, 14 parts by weight of a 50% aqueous dispersion of acrylic ester copolymer (for example the material sold under the tradename Acronol 50 D by the firm BASF, Germany) are added as adhesive while stirring. Subsequently are added 69 parts by weight of quartz powder having the grain distribution characteristic of FIG. 2, where the grain size is shown in micrometers while the ordinate is the percentage of weight of a particular grain size. The resultant cement can be stabilized by the use of known conservation materials. This cement is used especially for heavy coverings of all kinds, the floor coverings, walls and ceilings, especially even for those coverings in which the rear surface that makes contact with the cement is PVC foam, asbestos paper or the like. The water content of this cement is approximately 23 percent by weight.

Recipe 23

0.25 parts by weight of methylcellulose in powder form (viscosity 6,000 cP in 2% solution) are added while stirring as a stabilizer to 8 parts by weight of water and after solution are provided under stirring with 30 parts by weight of 50% aqueous dispersion of acrylic ester copolymer (for example Acronal 50 D as in recipe 1). Subsequently there are added while stirring 60 parts by weight quartz powder obeying the grain probability curve according to FIG. 2. The resultant cement contains approximately 23 percent by weight of water and is particularly suitable for very heavy wall or floor coverings of all kinds in cases where very high adhesion is required while the problem-free release of the covering is guaranteed due to splitting the cement layer.

Recipe 24

Same as recipe 22 but using only 10 parts by weight of water instead of 16 and in addition using 15 parts by weight of a macroparaffinic wax dispersion (a 30% dispersion in water). This wax dispersion improves the water-resistance of the cement and somewhat alters its adhesive properties. The wax dispersion may be that sold by the firm Hendricks and Sommer, Tönisvorst, Germany, under the tradename Ubatol EXP 21.

Recipe 25

Same as recipe 22 but having the following differences: Use 20 parts by weight of water and instead of the 50% aqueous dispersion of acrylic ester copolymer use an adhesive of the same weight, i.e., 40 parts by weight of a copolymer internally plasticized dispersion based on vinyl acetate-acrylic acid esters having the following data:

| | |
|---|---|
| Solids: | 53% |
| Polymer content | 53% |
| Grain size | 0.2-1.0 μ |
| pH | 4-5 |
| Viscosity | 40-80 P |
| Film forming temperature | +5° C. (± 1° C.) |
| Extensibility | ca. 900% |
| Tensile strength | ca. 20 kg/cm² |
| Emulsion/protective colliod | macromolecular substance |
| 53% aqueous dispersion | |

An adhesive of this type is marketed by the firm Kunstharze Gesellschaft mbH, 4154 Tönisvorst 1, Germany, under the tradename Ubatol KD-7510.

Recipe 26

Same as recipe 25 but instead of the plastic dispersion use as an adhesive the same weight proportion (14 parts by weight) of a terpolymer plastic dispersion based on vinyl acetate, vinyl versatate and acrylate, free from softeners and having the following characteristics:

| | |
|---|---|
| Solids | ca. 50% |
| Particle size | 0.2-1 μ |
| pH | 4.5 |
| Minimum temperature | − 6° C. |
| Viscosity | 5000-8000 cP |
| Film formation | + 3° C. |
| Emulsion system | macromolecular substance |
| Extensibility | 1200% (according to DIN 53 371) |
| Tensile strength | 15 kg/cm² |
| ca. 50% aqueous dispersion | |

This adhesive is made by the firm Kunstharze Gesellschaft mbH, D-4154 Tönisvorst 1, Germany, under the tradename Ubatol KD-7531.

Recipes 27 and 28

Same as recipe 23 but instead of using 8 parts by weight of water, use 10 parts by weight of water and furthermore, the adhesive used is 30 parts by weight of the dispersion indicated in recipe 25 or 26 instead of the 50% aqueous dispersion of acrylic ester copolymer. In all recipes other suitable filler powders, especially quartz powders of different grain size probability characteristics may be used. However, the quantities of powder to be used are reduced if the mean grain size decreases. It is often desirable to make sure that the composition of the cement is adjusted to the particular wallpaper or covering. This may be done by applying a layer of cement according to the invention to the wallpaper or covering at the factory or in an intermediate manufacturing stage in such a way that the cement forms a splittable layer at the rear surface of the wallpaper or covering which is optimally adjusted to this particular covering and is as thin as possible. The application of this layer may be made by machine and thus have uniform thickness. The problem-free releasability of the covering from its base is insured even if some other cement is used for applying the wallpaper or covering which itself is not splittable after drying and which thus would adhere very tightly to the covering and would make it very difficult to remove the latter from the base at a subsequent time.

The layer of cement previously applied as described above may have the characteristics of any one of the recipes listed above. A wallpaper which is useable could be any desired wallpaper, i.e., made from paper, plastic, textiles or the like, and would preferably be water-resistant or water-tight. The coverings may be preferably flexible but possibly also rigid coverings of all types, for example textile coverings (carpets, etc.) plastic coverings, foam coverings, asbestos coverings, plates, styropor, linoleum, tiles, etc. The previously applied layer may have irreversible adhesive characteristics which would make it necessary to employ an additional cement for applying this covering to its base. The additional cement can be any cement which is applied to the dried and splittable prior covering or to the wall, ceiling or floor to which the covering is to be attached, and the additional cement will not affect the splittability of the first layer. Therefore, the additional cement need not be itself splittable and may be any suitable cement, for example ordinary wallpaper paste, resinous glue, etc. However, this secondary cement may also be cement according to the present invention. On the other hand, the first applied cement on the wallpaper or covering may have reversible adhesive characteristics which are rejuvenated, for example by moistening with water so that no additional cement is required for attaching the covering to its base. If a first cement layer of irreversible adhesive properties is employed, the secondary layer may have reversible characteristics which are later rejuvenated by moistening.

The invention also includes a method for producing a wall covering or other covering which includes a layer of cement according to the invention. This method is described in a number of preferred embodiments and suitable cements are given with the recipes for their production.

EMBODIMENT 1

A cement is produced according to recipes 1 or 2. Instead of using polyalkyleneglycol ether as a softener, any other suitable softener may be employed, preferably polyethyleneglycol, molar weight 300. This cement is applied to the rear of the wallpaper or other covering in sufficient thickness to insure subsequent splittability of the dried layer. This layer is dried, thereby producing the splittable coating.

The quartz powder used may be that of FIG. 2 instead of FIG. 3 or some other suitable powder in suitable proportions. To prepare this wallpaper or covering for attachment at some later point, it is sufficient to soften the dried layer with water. It thereby reacquires its adhesive properties and this covering may then be attached without additional adhesive material to any suitable base. If the adhesive property of the layer is to be increased, the proportion by weight of methylcellulose and its softener may be suitably increased with respect to those indicated in recipes 1 or 2.

EXEMPLARY EMBODIMENT 2

Into 80 parts by weight of a 1% aqueous solution of methylcellulose (the methylcellulose powder used had a viscosity of 6000 cP in a 2% solution) are added by stirring 10-30 parts by weight of a 50% dispersion of acrylic acid butyl ester (for example the dispersion sold by the firm BASF Badische Anilin-und Sodafabriken AG, under the tradename Acronal 4 D). Subsequently there are added 100 parts by weight of fine quartz powder according to the grain size curve of FIG. 2 or some other suitable grain size curve, for example FIG. 1 or FIG. 3, with suitable changes in weight proportion according to the type of powder used. The resultant cement is then defoamed in the usual manner and may be provided with anti-fouling materials or suitable conservation materials. Substances which aid in the formation of a film may also be added, for example higher alcohols, aromates, or the like. This cement is then applied to the wallpaper or covering in a sufficient quantity to provide a splittable layer, and is then dried. This dried, splittable coating is only reversible with difficulty so that a fresh adhesive layer of any kind, for example paste, dispersion adhesive, glue or the like, of any desired adhesive strength may be used because the previously applied coating is already splittable and guarantees the easy removal of the covering from its base.

The adhesive power and the water-resistance of the cement made according to the embodiment 2 may be changed by the modification of the proportion of the acrylic acid butyl ester dispersion. The smaller the weight proportion of this dispersion, the lower the adhesive power and the water-resistance of the cement.

EMBODIMENT 3

Same as embodiment 2 but a part of the 1% methylcellulose solution is replaced by the same weight of a 30% macroparaffinic wax dispersion (as in example 1). This permits a control of the water repellency and the adhesive strength, preferably 10 to 40 parts by weight of a wax dispersion are used instead of a corresponding weight of the 1% methylcellulose solution.

The adhesive strength and the water resistance can also be controlled by other wax dispersions or by hydrophobic metal soaps or silicones and also in cements other than those according to the preceding prescriptions.

The foregoing relates to preferred exemplary embodiments of the invention, it being understood that other embodiments and variants are possible within the spirit and scope of the invention.

What is claimed is:

1. A cement for attaching coverings to walls, floors, ceilings and similar bases, comprising:

an adhesive substance which, when dried, is flexible; and a filler powder admixed with said adhesive substance, said filler powder being insoluble in and chemically non-reactive with said adhesive substance and substantially non-adherent to said adhesive substance and having a very small grain size such that the maximum of the distribution curve of the grain size lies in the region from 0.005 mm to 0.035 mm and wherein the grain size of at least the major portion by weight of said filler powder is uniform to within ± 0.018 mm, the cement having a viscosity such that the thickness of the cement in the dried condition is at least twice the average grain size of said filler powder; whereby, when said cement has dried, said coverings may be removed from said bases by pulling off said coverings to thereby split said cement in a manner which leaves a substantially continuous part of the cement layer on said bases and another such part on said coverings.

2. A cement as defined by claim 1, consisting essentially of said adhesive substance and said filler powder admixed thereto.

3. A cement as defined by claim 1, wherein the grain size of said filler powder is substantially uniform.

4. A cement as defined by claim 1, wherein the maximum of the distribution curve of the grain size in said filler powder lies in the region of 0.010-0.020 mm.

5. A cement as defined by claim 1, wherein the grain size of at least 95% by weight of said filler powder is uniform to within ±0.014 mm.

6. A cement as defined by claim 1, wherein the grain size of at least 50% by weight of said filler powder is uniform to within ±0.006 mm.

7. A cement as defined by claim 1, wherein the grain size of said filler powder is uniform to within ±0.0035 mm.

8. A cement as defined by claim 1, wherein the maximum of the distribution curve of the grain size of said filler powder is in the region of 0.015 to 0.020 mm, and preferably at approximately 0.017 mm.

9. A cement as defined by claim 1, wherein said filler powder is at least partially ground quartz powder.

10. A cement as defined by claim 1, wherein said filler powder is at least partially ground glass powder.

11. A cement as defined by claim 1, wherein said powder is at least partially constituted by polyethylene particles.

12. A cement as defined by claim 11, wherein said powder is at least partially softened PVC particles.

13. A cement as defined by claim 1, wherein said filler powder consists at least partially of rubber particles.

14. A cement as defined by claim 1, having a viscosity such that when said cement is applied to said covering the resultant layer has a thickness within the range of 2.5 to 4 times the average grain size of said filler powder.

15. A cement as defined by claim 1, wherein said adhesive substance is an aqueous dispersion.

16. A cement as defined by claim 15, wherein said adhesive substance is a dispersion of an acrylic ester copolymer.

17. A cement as defined by claim 15, wherein said adhesive substance is a terpolymer synthetic dispersion based on vinyl acetate, vinyl versatate and acrylate.

18. A cement as defined by claim 15, wherein said adhesive substance is an internally plasticized copolymer dispersion on the basis of vinyl acetate-acrylic acid esters.

19. A cement as defined by claim 1, wherein said adhesive substance comprises a glue dissolved in water.

20. A cement as defined by claim 19, wherein said adhesive substance also contains methylcellulose and polyethyleneglycol as a softener.

21. A cement as defined by claim 1, wherein the dried weights of said adhesive substance and said filler powder are such that 5 to 20% of the volume of the dried cement is adhesive substance and 80 to 95% of the volume is said filler powder.

22. A cement as defined by claim 1, wherein the constituent particles of said filler powder have smooth surfaces.

23. A cement as defined by claim 22, wherein said particles are of substantially spherical shape.

24. A cement as defined by claim 1, in which said adhesive substance includes an aqueous, macroparaffinic wax dispersion, silicone or a hydrophobic metal soap.

25. A cement as defined by claim 1, wherein said filler powder consists substantially of quartz powder.

26. A cement as defined by claim 1, wherein said filler powder is ground quartz or glass powder and wherein the water content of said cement is no greater than 30% by weight and preferably 20–25% by weight.

27. A covering for walls, floors, or ceilings or similar bases, one surface of which is supplied with a layer of a cement that comprises:
an adhesive substance which, when dried, is flexible:
a filler powder admixed with said adhesive substance, said filler powder being insoluble in and chemically non-reactive with said adhesive substance and substantially non-adherent to said adhesive substance and having a very small grain size such that the maximum of the distribution curve of the grain size lies in the region from 0.005 mm to 0.035 mm and wherein the grain size of at least the major portion by weight of said filler powder is uniform to within ±0.018 mm, the cement having a viscosity such that the thickness of the cement in the dried condition is at least twice the average grain size of said filler powder; whereby, when said cement has dried, said coverings may be removed from said bases by pulling off said coverings to thereby split said cement in a manner which leaves a substantially continuous part of the cement layer on said bases and another such part on said coverings.

28. A covering as defined by claim 27, wherein the adhesive property of said adhesive substance in said layer is irreversible; whereby an additional cement is required for attaching said covering to said base.

29. A covering as defined by claim 28, wherein the adhesive property of said adhesive substance can be rejuvenated by moistening with water; whereby said layer reacquires adhesive properties and can be used for the attachment of said covering to said base without an additional layer of cement.

30. A method for producing a covering for walls, floors, ceilings and similar bases comprising the steps of:
applying to said covering a cement which includes an adhesive substance which, when dried, is flexible; and a filler powder admixed with said adhesive substance, said filler powder being insoluble in and chemically non-reactive with said adhesive substance and substantially non-adherent to said adhesive substance and having a very small grain size such that the maximum of the distribution curve of the grain size lies in the region from 0.005 mm to 0.035 mm and wherein the grain size of at least the major portion by weight of said filler powder is uniform to within ±0.018 mm, the cement having a viscosity such that the thickness of the cement in the dried condition is at least twice the average grain size of said filler powder; whereby, when said cement has dried, said coverings may be removed from said bases by pulling off said coverings to thereby split said cement in a manner which leaves a substantially continuous part of the cement layer on said bases and another such part on said coverings; and drying said layer of cement.

31. A cement as defined by claim 1, wherein the maximum of the distribution curve of the grain size in said filler powder lies in the region of 0.020 mm to 0.030 mm.

32. A cement in accordance with claim 1 characterized in that the filling powder consists of 100% quartz powder.

* * * * *

UNITED STATES PATENT AND TRADEMARK OFFICE
CERTIFICATE OF CORRECTION

PATENT NO. : 4,162,237
DATED : July 24, 1979
INVENTOR(S) : ALBERT KAUDERER

It is certified that error appears in the above-identified patent and that said Letters Patent are hereby corrected as shown below:

[76] Address of applicant should read:

7315 Weilheim, Fed. Rep. of Germany

Signed and Sealed this

Twenty-seventh Day of November 1979

[SEAL]

Attest:

RUTH C. MASON
Attesting Officer

LUTRELLE F. PARKER
Acting Commissioner of Patents and Trademarks